(12) United States Patent
Lee et al.

(10) Patent No.: US 9,393,940 B2
(45) Date of Patent: Jul. 19, 2016

(54) METHOD AND SYSTEM FOR CONTROLLING ANTI-LOCK BRAKE SYSTEM OPERATION OF VEHICLE

(71) Applicant: Hyundai Motor Company, Seoul (KR)

(72) Inventors: Dong Hun Lee, Gyeonggi-do (KR); Jae Won Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 228 days.

(21) Appl. No.: 14/099,234

(22) Filed: Dec. 6, 2013

(65) Prior Publication Data

US 2015/0112528 A1 Apr. 23, 2015

(30) Foreign Application Priority Data

Oct. 18, 2013 (KR) .................. 10-2013-0124834

(51) Int. Cl.
*B60T 8/1761* (2006.01)
*B60L 7/10* (2006.01)
*B60L 3/10* (2006.01)

(52) U.S. Cl.
CPC .............. *B60T 8/1761* (2013.01); *B60L 3/108* (2013.01); *B60L 7/10* (2013.01); *B60T 8/17616* (2013.01); *B60T 2270/602* (2013.01)

(58) Field of Classification Search
CPC ...... B60T 8/1761; B60T 8/17616; B60L 7/10
See application file for complete search history.

(56) References Cited

U.S. PATENT DOCUMENTS

| | | | | |
|---|---|---|---|---|
| 4,962,969 A * | 10/1990 | Davis | ......... | B60T 8/00 188/156 |
| 5,615,933 A * | 4/1997 | Kidston | ......... | B60L 3/102 180/65.1 |
| 6,488,344 B2 * | 12/2002 | Huls | ......... | B60L 7/10 180/165 |
| 6,588,860 B2 * | 7/2003 | Kosik | ......... | B60K 6/48 303/152 |
| 6,595,602 B2 * | 7/2003 | Jokic | ......... | B60T 8/1755 303/146 |
| 6,687,593 B1 * | 2/2004 | Crombez | ......... | B60T 1/10 180/170 |
| 6,709,075 B1 * | 3/2004 | Crombez | ......... | B60L 3/102 303/152 |
| 7,104,617 B2 * | 9/2006 | Brown | ......... | B60K 6/44 303/152 |

(Continued)

FOREIGN PATENT DOCUMENTS

| | | |
|---|---|---|
| JP | 2000-270406 A | 9/2000 |
| JP | 2005-162009 A | 6/2005 |

(Continued)

*Primary Examiner* — Thomas G Black
*Assistant Examiner* — Peter D Nolan
(74) *Attorney, Agent, or Firm* — Mintz Levin Cohn Ferris Glovsky and Popeo, P.C.; Peter F. Corless

(57) ABSTRACT

A method and system for controlling the operation of an Anti-lock Brake System (ABS) are provided. The system includes an ABS controller and a vehicle controller. The ABS controller enables an ABS operation signal when an ABS operation is necessary. The vehicle controller receives the enabled ABS operation signal from the ABS controller and adjusts the output of motor torque based on the received ABS operation signal. The ABS controller operates the ABS when a signal indicating that the motor torque has been removed is received from the vehicle controller.

8 Claims, 3 Drawing Sheets

(56) References Cited

U.S. PATENT DOCUMENTS

| | | | | |
|---|---|---|---|---|
| 7,152,934 B2* | 12/2006 | Fuhrer | B60L 7/10 | |
| | | | 303/152 | |
| 7,281,770 B1* | 10/2007 | Curran | B60L 7/18 | |
| | | | 303/151 | |
| 7,575,287 B2* | 8/2009 | Matsuura | B60K 6/365 | |
| | | | 303/152 | |
| 7,654,620 B2* | 2/2010 | Jeon | B60L 3/10 | |
| | | | 303/138 | |
| 8,066,339 B2* | 11/2011 | Crombez | B60L 7/18 | |
| | | | 303/152 | |
| 8,303,049 B2* | 11/2012 | Busack | B60T 8/17616 | |
| | | | 303/151 | |
| 8,342,618 B2* | 1/2013 | Yanagida | B60K 28/16 | |
| | | | 180/65.1 | |
| 8,712,616 B2* | 4/2014 | Treharne | B60L 1/003 | |
| | | | 180/65.265 | |
| 8,788,144 B2* | 7/2014 | Krueger | B60L 3/10 | |
| | | | 180/65.265 | |
| 8,862,358 B2* | 10/2014 | Bayar | B60L 7/18 | |
| | | | 303/152 | |
| 8,977,465 B2* | 3/2015 | Kim | B60L 3/104 | |
| | | | 303/152 | |
| 2005/0127750 A1* | 6/2005 | Fuhrer | B60L 7/10 | |
| | | | 303/152 | |
| 2006/0220453 A1* | 10/2006 | Saito | B60L 7/26 | |
| | | | 303/152 | |
| 2008/0100132 A1* | 5/2008 | Jeon | B60L 3/10 | |
| | | | 303/152 | |
| 2009/0005947 A1* | 1/2009 | Maeda | B60K 6/445 | |
| | | | 701/88 | |
| 2010/0117567 A1* | 5/2010 | Jeon | B60L 3/10 | |
| | | | 318/376 | |
| 2012/0265419 A1* | 10/2012 | Kim | B60L 3/104 | |
| | | | 701/71 | |

FOREIGN PATENT DOCUMENTS

| | | |
|---|---|---|
| JP | 2007-331540 A | 12/2007 |
| JP | 2011-126432 A | 6/2011 |
| KR | 10-2009-0090072 A | 8/2009 |
| KR | 10-2011-0033723 A | 3/2011 |
| KR | 10-2012-0124899 A | 11/2012 |
| KR | 10-2013-0011839 A | 1/2013 |

* cited by examiner

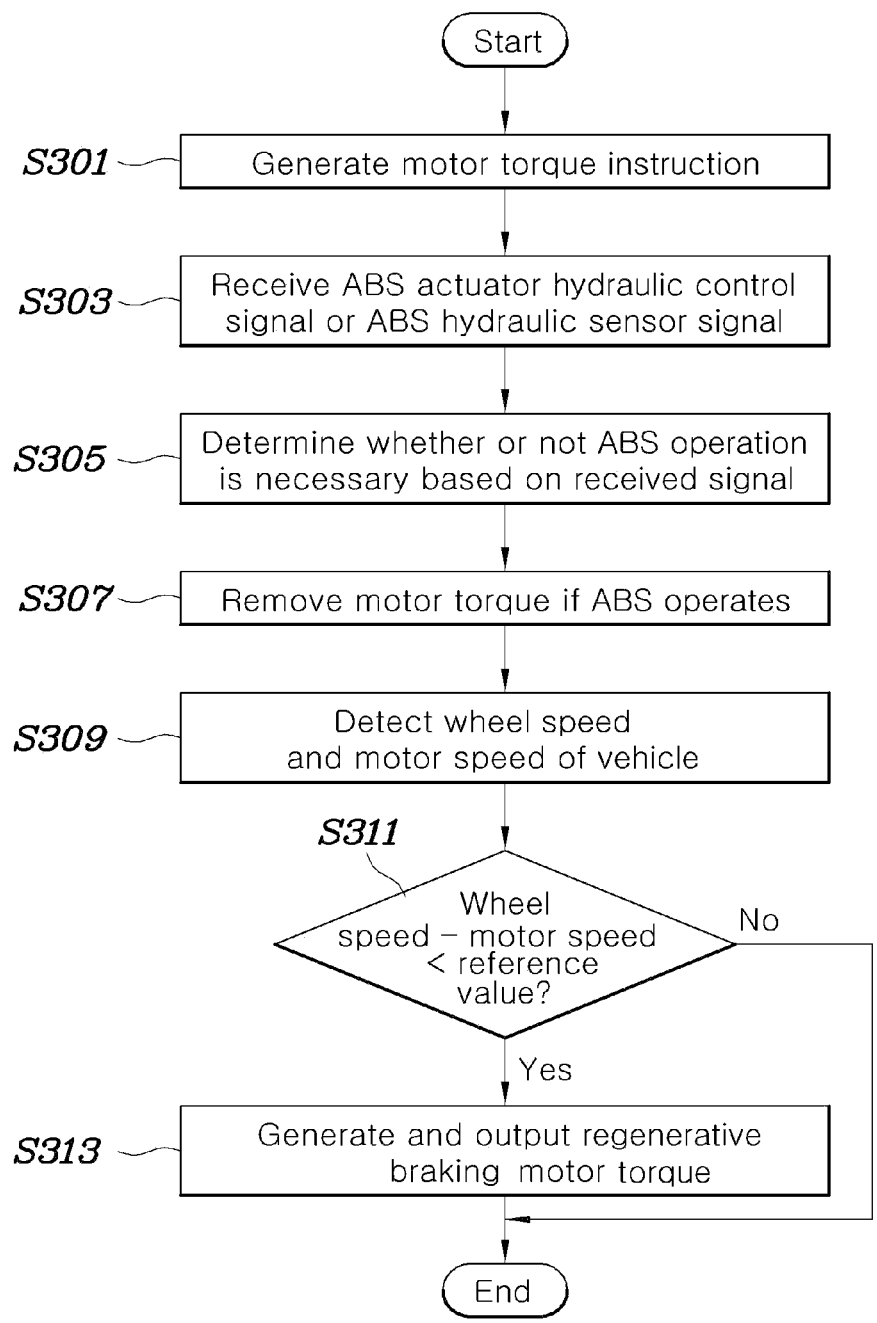

METHOD AND SYSTEM FOR CONTROLLING ANTI-LOCK BRAKE SYSTEM OPERATION OF VEHICLE

CROSS REFERENCE TO RELATED APPLICATION

The present application claims priority to Korean Patent Application No. 10-2013-0124834 filed Oct. 18, 2013, the entire contents of which is incorporated herein for all purposes by this reference.

BACKGROUND

1. Field of the Invention

The present invention relates generally to a method and system for controlling the operation of an Anti-lock Brake System (ABS) and, more particularly, to a method and system for controlling the operation of an ABS, which reduces a loss of gas mileage by efficiently removing motor torque by detecting the operation of the ABS more accurately.

2. Description of the Related Art

For a hydraulic brake, the braking of a vehicle is performed by braking hydraulic pressure applied from a master cylinder when a brake pedal is engaged. When braking power greater than static friction force between a road surface and tires is applied to the tires, a slip phenomenon, that is, a phenomenon in which the tires slide on the road surface, is generated. To prevent such a phenomenon and maintain stable braking power, an ABS has been developed. An ABS detects a slip phenomenon and adjusts braking hydraulic pressure based on the detection to stop a vehicle within the shortest distance. An ABS may include an (electronic control unit) ECU that operates electrical elements and hydraulic control devices, such as a plurality of solenoid valves, an accumulator, and a hydraulic pump that adjusts braking hydraulic pressure transferred to hydraulic brakes. In general, a slip value is calculated based on wheel speed detected by sensors and vehicle speed estimated from the wheel speed, and an ABS operates when the calculated slip value reaches a predetermined slip value.

For an electric vehicle or a fuel cell vehicle, when rapid braking is performed with substantially low friction, noise and wheel vibration are generated in a driving motor when an ABS initially operates. because the noise and wheel vibration is generated since unlike in an engine vehicle using an automatic transmission, the driving motor, a decelerator, and wheels are directly connected without a hydraulic transmission, the driving motor leans toward a regenerative braking direction due to a coast regenerative braking action (which performs a function similar to that of an engine brake) prior to braking, and a shock is applied to the driving motor since braking power is suddenly changed due to a sudden reduction in braking hydraulic pressure when the ABS is operated while force attributable to inertia during rapid braking is applied in the direction of driving.

SUMMARY

Accordingly, the present invention provides a method and system for controlling the ABS operation of a vehicle, which operate an ABS stably and efficiently in a fuel cell or electric vehicle.

In accordance with an aspect of the present invention, a method of controlling the operation of the ABS of a vehicle may include enabling an ABS operation signal when an ABS operation is necessary; transmitting the enabled ABS operation signal to a vehicle controller; and operating the ABS when a motor torque removal signal indicating that motor torque has been removed in response to the ABS operation signal is received from the vehicle controller.

The method may further include setting a maximum standby time for the removal of the motor torque after transmitting the enabled ABS operation signal. In addition, the method may include operating the ABS after the maximum standby time has elapsed. The maximum standby time may be extracted and set from a previously generated maximum standby time table based on a driving state and a driving environment of the vehicle. In particular, the maximum standby time may be set to about 0 when the ABS operation is necessary regardless of whether the motor torque has been removed. The method may further include stopping the ABS operation when the ABS operation is not necessary during the ABS operation, and disabling the ABS operation signal; and transmitting the disabled ABS operation signal to the vehicle controller.

In accordance with another aspect of the present invention, a method of controlling the operation of the ABS of a vehicle may include generating, by a vehicle controller, a motor torque instruction that enables a motor to be operated based on a movement of an acceleration pedal or brake pedal of the vehicle; receiving, by the vehicle controller, an ABS operation signal that indicates whether an ABS operation is necessary from an ABS controller that operates the ABS of the vehicle; removing, by the vehicle controller, motor torque when the ABS operation signal is received, and transmitting a motor torque removal signal that indicates that the motor torque has been removed to an ABS controller; and operating, by the ABS controller, the ABS when the motor torque removal signal is received.

In accordance with another aspect of the present invention, a method of controlling the operation of the ABS of a vehicle may include generating, by a vehicle controller, a motor torque instruction that enables a motor to be operated based on a movement of an acceleration pedal or brake pedal of the vehicle; determining, by the vehicle controller, whether the ABS is operating by receiving a hydraulic control signal or hydraulic sensor signal of the ABS from an ABS controller that operates the ABS of the vehicle; and removing, by the vehicle controller, motor torque when it is determined that the ABS is operating.

The method may further include detecting, by the vehicle controller, a wheel speed of the vehicle and a speed of the motor during the ABS operation; and generating and outputting, by the vehicle controller, regenerative braking motor torque when a difference between the detected wheel speed and the detected motor speed is less than a predetermined reference value.

In accordance with still another aspect of the present invention, a system for controlling the operation of the ABS of a vehicle may include an ABS controller configured to enable an ABS operation signal when an ABS operation is necessary; and a vehicle controller configured to receive the enabled ABS operation signal from the ABS controller and operate an output of motor torque based on the received ABS operation signal; wherein the ABS controller is configured to operate the ABS when a signal that indicates that the motor torque has been removed is received from the vehicle controller.

The ABS controller may be configured to set a maximum standby time for the removal of the motor torque. The ABS controller may further be configured to operate the ABS after the maximum standby time has elapsed. The maximum standby time may be extracted and set from a previously generated maximum standby time table based on a driving state and driving environments of the vehicle. The vehicle controller may be configured to detect the wheel speed of the vehicle and speed of the motor during the ABS operation, and generate and output regenerative braking motor torque when the difference between the detected wheel speed and the detected motor speed is less than a predetermined reference value.

BRIEF DESCRIPTION OF THE DRAWINGS

The above and other objects, features and advantages of the present invention will be more clearly understood from the following detailed description taken in conjunction with the accompanying drawings, in which:

FIG. 3 is an exemplary flowchart illustrating a control method on the vehicle controller side in a method of controlling the ABS operation of a vehicle according to another exemplary embodiment of the present invention.

DETAILED DESCRIPTION

Figure 1:
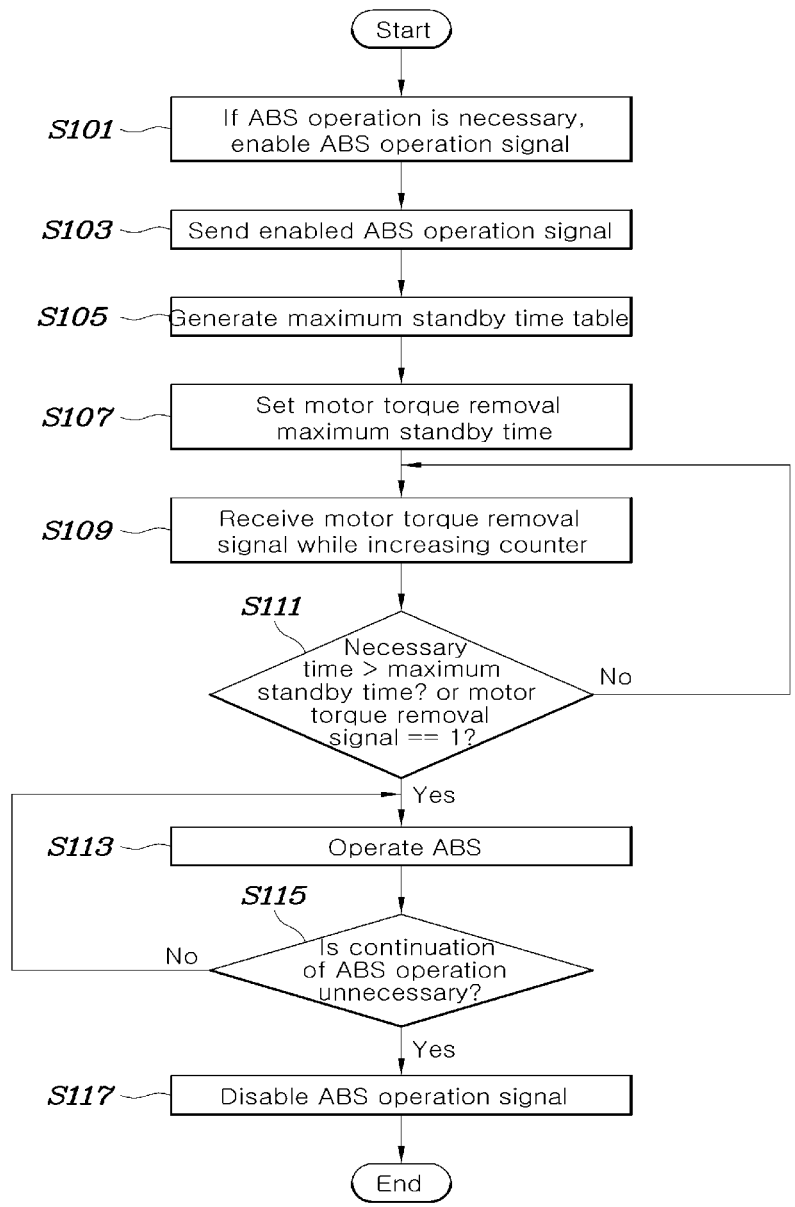
FIG. 1 is an exemplary flowchart illustrating a control method on the ABS controller side in a method of controlling the ABS operation of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about"

Specific structural and functional descriptions of exemplary embodiments of the present invention disclosed in this specification or the application have been merely illustrated to describe the exemplary embodiments of the present invention. The exemplary embodiments of the present invention may be implemented in various forms and should not be construed as being limited to embodiments described in this specification or application. Further, the exemplary embodiments of the present invention may be modified in various ways and may have several forms, and thus exemplary embodiments are illustrated in the drawings and are described in detail in this specification or the application. An exemplary embodiment according to the concept of the present invention is not intended to be limited to a specific disclosure, and it is to be understood that the embodiment includes all changes, equivalents, and substitutions which fall within the spirit and technical scope of the present invention.

Terms, such as the first and the second, may be used to describe a variety of elements, but the elements should not be limited by the terms. The terms are used to only distinguish one element from the other element. For example, a first element may be named a second element, and likewise a second element may be named a first element without departing from the scope of the present invention.

When one element is described as being "connected" to or "coupled" with the other element, the one element may be directly connected to or coupled with the other element, but it should be understood that a third element may be interposed between the two elements. In contrast, when it is said that one element is described as being "directly connected" to or "directly coupled" with the other element, it should be understood that a third element is not present between the two elements. Meanwhile, the same principle applies to other expressions, such as "between ~" and "just between ~" or "adjacent to ~" and "neighboring ~", which describe a relation between elements.

Terms used in this specification are used to describe only exemplary embodiments and are not intended to limit the present invention. An expression of the singular number should be understood to include plural expressions, unless clearly expressed otherwise in the context. Terms, such as "include" or "have", should be understood to indicate the existence of a set characteristic, number, step, operation, element, part, or a combination of them and not to exclude the existence of one or more other characteristics, numbers, steps, operations, elements, parts, or a combination of them or a possibility of the addition of them. All terms used herein, including technical or scientific terms, have the same meanings as those typically understood by those having ordinary skill in the art, unless otherwise defined. Terms, such as ones defined in common dictionaries, should be construed as having the same meanings as terms in the context of related technology and should not be construed as having ideal or excessively formal meanings unless clearly defined in this specification.

Some exemplary embodiments of the present invention are described in detail with reference to the accompanying drawings. The same reference numerals indicate the same elements through the drawings.

FIG. 1 is an exemplary flowchart illustrating a control method on the ABS controller side in a method of controlling the ABS operation of a vehicle according to an exemplary embodiment of the present invention.

The ABS controller according to an exemplary embodiment of the present invention may be configured to determine whether an ABS operation is necessary based on a plurality of vehicle sensor signals that determine an ABS operation. When, as a result of the determination, the ABS operation is determined to be necessary, the ABS controller may be configured to enable an ABS operation signal at step S101. The ABS operation signal may not mean that the ABS operation is in an on state, but may mean the state in which the ABS operation is necessary by determining that it is an ABS operation condition. The ABS controller may be configured to enable the ABS operation signal and transmit the enabled ABS operation signal to a vehicle controller at step S103. In other words, prior to the execution of the ABS operation, the ABS controller may be configured to transmit the ABS operation signal to the vehicle controller that determines motor torque.

After transmitting the ABS operation signal to the vehicle controller, the ABS controller may be configured to generate a maximum standby time table based on the driving state and driving environments of the vehicle at step S105. For example, to determine a motor torque removal maximum standby time "α", the ABS controller may be configured to generate the maximum standby time table including a maximum standby time that has been experimentally determined based on the degree of slide of a road surface, vehicle speed, a brake pedal signal, and a change in the pedal signal, that is, the degree of danger of the vehicle, in response to a plurality of sensor signals for determining the ABS operation. Due to the above influencing factors, the maximum standby time may decrease as a road surface becomes more slippery and vehicle speed is increased, and may decrease as a driver's intention to decelerate increases, that is, as a brake pedal signal or a change in the brake is increased.

The ABS controller may be configured to set a motor torque removal maximum standby time based on the generated maximum standby time table at step S107. When a control determination that indicates that the ABS operation is necessary is made, the ABS controller may be configured to measure a necessary time from the time when the control determination is made. The necessary time may be measured by a counter. The ABS controller may be configured to receive a motor torque removal signal that indicates that motor torque has been removed, from the vehicle controller while increasing the counter to measure the necessary time at step S109.

The ABS controller be configured to determine whether a current necessary time is greater than a maximum standby time that has been set based on a corresponding environment, the degree of risk, or whether a motor torque removal signal has been received at step S111. More particularly, the ABS controller may be configured to operate the ABS when the ABS controller receives a signal, indicating that the motor torque has been removed, from the vehicle controller or when the maximum standby time elapses regardless of whether a motor torque removal signal has been received at step S113.

When the current necessary time is less than the maximum standby time and the signal indicating that the motor torque has been removed is not received from the vehicle controller, the ABS controller may be configured to continue to determine whether a motor torque control signal is in an enabled state by receiving the motor torque control signal while increasing the necessary time through the counter.

Thereafter, the ABS controller may be configured to determine whether the continuation of the ABS operation is unnecessary at step S115. In other words, when the vehicle has been restored to a normal state (e.g., when the ABS operation is unnecessary) based on the number of rotations of a front wheel and a rear wheel and whether a slip has occurred, the ABS controller may be configured to disable the ABS operation signal at step S117. In addition, the vehicle controller may be configured to transfer motor torque output, having a normal not equal to 0, to the motor controller in response to the disabled ABS operation signal.

For reference, when the ABS controller is to perform an ABS operation in response to determining that the ABS operation is necessary, the maximum standby time "α" may be set to about 0. In particular, the ABS controller may be configured to transmit an ABS operation signal to the vehicle controller and then operate the ABS although the vehicle controller has not removed motor torque. Furthermore, the ABS controller may be configured to operate the ABS although a motor torque removal signal is not received from the vehicle controller within a set maximum standby time.

Figure 2:
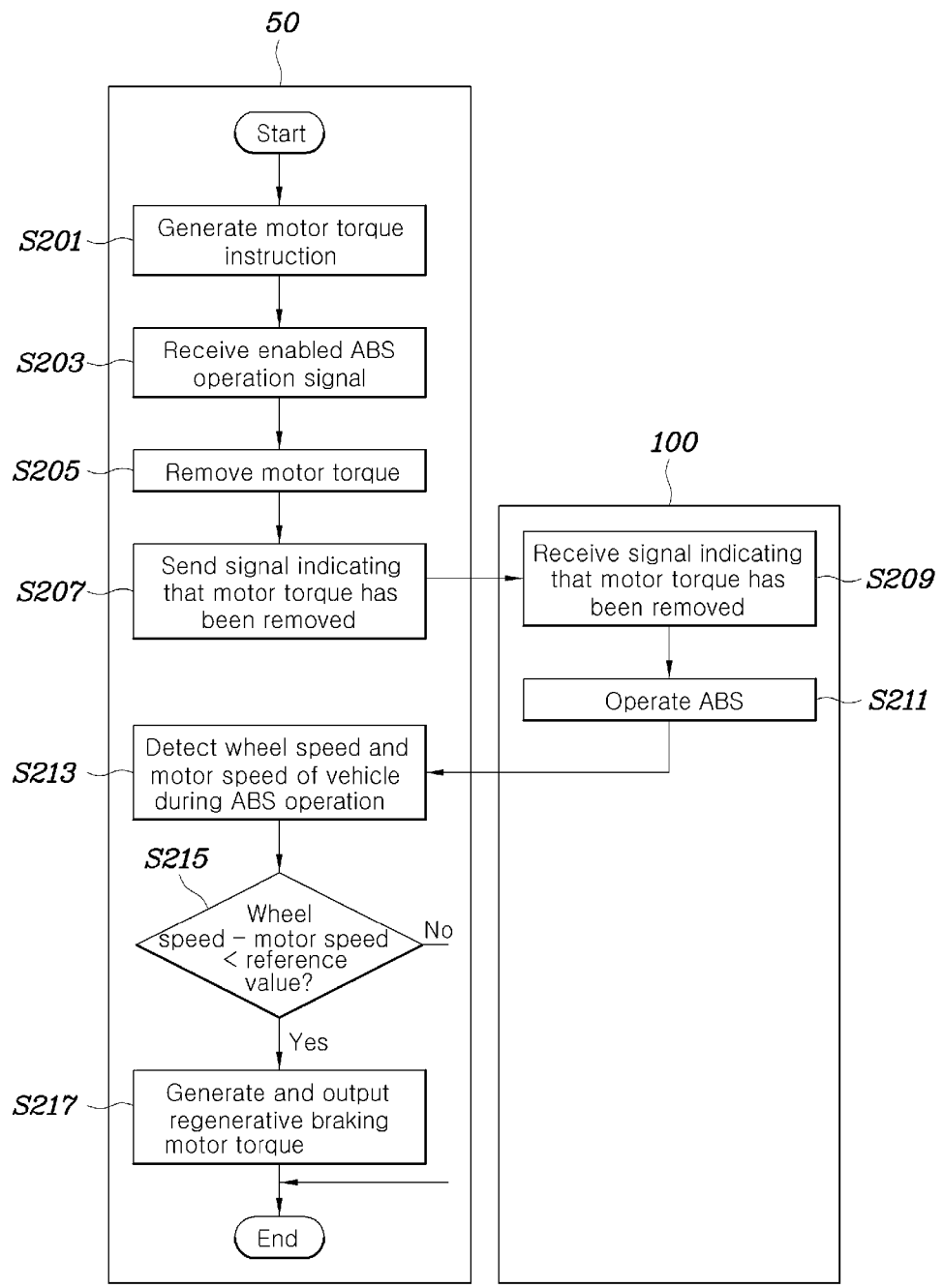
FIG. 2 is an exemplary flowchart illustrating a control method on the system side in a method of controlling the ABS operation of a vehicle according to an exemplary embodiment of the present invention.

FIG. 2 is an exemplary flowchart illustrating a control method on the system side in a method of controlling the ABS operation of a vehicle according to an exemplary embodiment of the present invention. The system for controlling the ABS operation of a vehicle may include the vehicle controller 50 and the ABS controller 100. A flowchart on the left side of FIG. 2 illustrates steps performed by the vehicle controller 50, that is, the main body, and a flowchart on the right side of FIG. 2 illustrates steps performed by the ABS controller 100. The steps performed by the vehicle controller 50 and the ABS controller 100 may be performed independently. In other words, the vehicle controller 50 and the ABS controller 100 may cooperatively adjust an ABS operation and motor torque by transmitting and receiving signals using wireless communication including control area network (CAN) communication and wired communication using wires. Communication speed between the ABS controller 100 and the vehicle controller 50 may be determined such that delay of an ABS operation that may occur due to the control method does not generate a problem influencing the safety of a driver.

The vehicle controller 50 may be configured to generate a torque instruction to output necessary motor torque based on information collected while driving during a process of controlling motor torque and may be configured to output the torque instruction. In response to the torque instruction, a motor controller (not shown) may be configured to generate necessary torque by adjusting (i.e., 3-phase current control) motor torque using an inverter (not shown). The vehicle controller 50 may be configured to determine whether an ABS operation is necessary more accurately and effectively since the ABS controller 100 may be configured to directly receive a value indicating a determination of whether an ABS operation is necessary. Furthermore, the vehicle controller 50 may be configured to determine whether the ABS is operating in response to an ABS actuator hydraulic control signal (or control instruction signal) and an ABS hydraulic sensor signal. For example, when communication is not performed between the ABS controller 100 and the vehicle controller 50, whether an ABS operation is necessary may be determined in response to an ABS actuator hydraulic control signal (or control instruction signal) and an ABS hydraulic sensor signal, but the present invention is not limited thereto.

Further, the vehicle controller 50 may be configured to continue generating a motor torque instruction at step S201. The vehicle controller 50 may be configured to generate a motor torque instruction that instructs the motor to be operated based on a movement (e.g., engagement) of the acceleration pedal or brake pedal of the vehicle. An enabled ABS operation signal may be received from the ABS controller 100 at step S203. In response to the enabled ABS operation signal, the vehicle controller 50 may be configured to remove motor torque at step S205. Furthermore, the vehicle controller 50 may be configured to transmit a motor torque removal signal indicating that the motor torque has been removed to the ABS controller 100 at step S207. When the motor torque removal signal is received from the vehicle controller 50 at step S209, the ABS controller 100 may be configured to operate the ABS at step S211.

While the ABS operates, the vehicle controller 50 may be configured to detect wheel speed and motor speed of the vehicle at step S213. After the ABS operates, the generation of hydraulic braking power may be repeatedly turned on and off rapidly. In particular, a small vibration may be generated due to the motor and a decelerator (not shown) being separated from a stopper attached to the vehicle body when motor torque is about 0. Accordingly, the vehicle controller 50 may be configured to generate motor regenerative braking power in sections other than an initial ABS operation section, and the motor and the decelerator remain in contact with the stopper to reduce the vibration of the vehicle.

The vehicle controller 50 may be configured to compare rotating speed of the wheel with rotating speed of the driving shaft of the motor while the ABS operates at step S215. When, as a result of the comparison, an error calculated based on a difference between the rotating speed of the wheel and the rotating speed of the driving shaft is less than a predetermined reference value, the vehicle controller 50 may be configured to determine that a slip has been reduced from a slip when the ABS first operates and then generate a reduced regenerative braking torque instruction value at step S217. More particularly, when regenerative braking is performed, a torque instruction value may be a negative (−) value. When as a result of the comparison, an error calculated based on a difference between the rotating speed of the wheel and the rotating speed of the driving shaft is greater than a predetermined reference value, the vehicle controller 50 may be configured to stop the generation of motor torque as in an existing ABS operation.

FIG. 3 is an exemplary flowchart illustrating a control method on the vehicle controller side in a method of controlling the ABS operation of a vehicle according to another exemplary embodiment of the present invention.

The vehicle controller 50 may be configured to continue generating a motor torque instruction at step S301. The vehicle controller 50 may be configured to generate a motor torque instruction that enables the motor to be operated based on the movement of the acceleration pedal or brake pedal of the vehicle. Further, the vehicle controller 50 may be configured to receive an ABS actuator hydraulic control signal (or control instruction signal) or an ABS hydraulic sensor signal from the ABS controller 100 at step S303 and determine whether an ABS operation is necessary based on the ABS actuator hydraulic control signal (or control instruction signal) or the ABS hydraulic sensor signal at step S305. In other words, unlike in the exemplary embodiment of FIG. 2, the vehicle controller 50 may not receive an enabled ABS operation signal that indicates that an ABS operation is necessary, but the vehicle controller 50 may be configured to directly receive the ABS actuator hydraulic control signal (or control instruction signal) or the ABS hydraulic sensor signal that indicates whether the ABS operates and remove motor torque when the ABS operates at step S307. Whether the ABS operates and the removal of motor torque may be performed almost simultaneously.

While the ABS is being operated, the vehicle controller 50 may be configured to detect the wheel speed and motor speed of the vehicle at step S309. After the ABS has been operated, the generation of hydraulic braking power may be repeatedly turned on and off rapidly. In particular, a substantially small vibration may be generated due to the motor and a decelerator (not shown) being separated from a stopper attached to the vehicle body when motor torque is about 0. Accordingly, the vehicle controller 50 may be configured to generate motor regenerative braking power in sections other than an initial ABS operation section, and the motor and the decelerator may remain in contact with the stopper to reduce the vibration of the vehicle.

The vehicle controller 50 may be configured to compare rotating speed of the wheel with rotating speed of the driving shaft of the motor while the ABS operates at step S311. When, as a result of the comparison, an error calculated based on a difference between the rotating speed of the wheel and the rotating speed of the driving shaft is less than a predetermined reference value, the vehicle controller 50 may be configured to determine that a slip has been reduced from a slip when the ABS first operates and then generate a substantially small regenerative braking torque instruction value at step S313. More particularly, when regenerative braking is performed, a torque instruction value may be a negative (−) value. When as a result of the comparison, an error calculated based on a difference between the rotating speed of the wheel and the rotating speed of the driving shaft is greater than a predetermined reference value, the vehicle controller 50 may be configured to stop the generation of motor torque as in an existing ABS operation.

In accordance with the method and system for controlling the ABS operation of a vehicle according to an exemplary embodiment of the present invention, shock and vibration of a vehicle occurring during an ABS operation may be reduced by removing motor torque to about 0 when the ABS operates. Furthermore, erroneous detection of an ABS operation may be prevented since a signal indicating whether an ABS operation is necessary may be received from the ABS controller to directly adjust the ABS operation. Accordingly, a loss of gas mileage may be reduced and a reduction of braking power may be prevented since the unnecessary blocking of motor regenerative braking attributable to erroneous detection may be prevented.

In addition, vibration and shock generated in a vehicle may be reduced since the vehicle controller may be configured to directly receive a control signal or a braking hydraulic sensor signal to adjust ABS hydraulic pressure from the ABS controller, determine whether an ABS operation is necessary, and remove motor torque. Further, a substantially small vibration may be prevented and gas mileage may be improved since motor regenerative braking power may be generated in sections other than an initial ABS operation section. When regenerative braking is stopped or restarted may be accurately controlled since the time when an ABS operation is started or ended may be checked.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling an operation of an Anti-lock Brake System (ABS) of a vehicle, comprising:
   generating, by a vehicle controller, a motor torque instruction that enables a motor to be operated based on a movement of an acceleration pedal or a brake pedal of the vehicle;
   receiving, by the vehicle controller, an ABS operation signal that indicates whether the ABS operation is necessary from an ABS controller configured to operate the ABS of the vehicle;
   removing, by the vehicle controller, motor torque when the ABS operation signal is received, and sending a motor torque removal signal indicating that the motor torque has been removed to the ABS controller to operate the ABS;
   detecting, by the vehicle controller, a wheel speed of the vehicle and a speed of the motor during ABS operation; and
   generating and outputting, by the vehicle controller, regenerative braking motor torque during the ABS operation when a difference between the detected wheel speed and the detected motor speed is lees than a predetermined reference value.

2. A method of controlling an operation of an Anti-lock Brake System (ABS) of a vehicle, comprising:
   generating, by a vehicle controller, a motor torque instruction that enables a motor to be operated based on a movement of an acceleration pedal or a brake pedal of the vehicle;
   determining, by the vehicle controller, whether the ABS is operating by receiving a hydraulic control signal or hydraulic sensor signal of the ABS from an ABS controller that operates the ABS of the vehicle;
   removing, by the vehicle controller, motor torque in response to determining that the ABS is operating;
   detecting, by the vehicle controller, a wheel speed of the vehicle and a speed of the motor during the ABS operation; and
   generating and outputting, by the vehicle controller, regenerative braking motor torque during the ABS operation when a difference between the detected wheel speed and the detected motor speed is lees than a predetermined reference value.

3. A system for controlling an operation of an Anti-lock Brake System (ABS) of a vehicle, comprising:
   an ABS controller configured to enable an ABS operation signal when the ABS operation is necessary; and
   a vehicle controller configured to:
      receive the enabled ABS operation signal from the ABS controller and adjust an output of motor torque based on the received ABS operation signal,
      detect a wheel speed of the vehicle and a speed of the motor during the ABS operation, and
      generate and output regenerative braking motor torque during the ABS operation when a difference between the detected wheel speed and the detected motor speed is less than a predetermined reference value,
   wherein the ABS controller is configured to operate the ABS when a signal indicating that the motor torque has been removed is received from the vehicle controller.

4. The system of claim 3, wherein the ABS controller is configured to set a maximum standby time for the removal of the motor torque.

5. The system of claim 4, wherein the ABS controller is configured to operate the ABS after the maximum standby time has elapsed.

6. The system of claim 4, wherein the maximum standby time is extracted and set from a previously generated maximum standby time table based on a driving state and driving environments of the vehicle.

7. A non-transitory computer readable medium containing program instructions executed by a controller, the computer readable medium comprising:
   program instructions that generate a motor torque instruction that enables a motor to be operated based on a movement of an acceleration pedal or a brake pedal of the vehicle;
   program instructions that receive an ABS operation signal that indicates whether the ABS operation is necessary from an ABS controller configured to operate the ABS of the vehicle;
   program instructions that remove motor torque when the ABS operation signal is received, and sending a motor torque removal signal indicating that the motor torque has been removed to the ABS controller to operate the ABS;
   program instruction that detect a wheel speed of the vehicle and a speed of the motor during the ABS operation; and
   program instructions that generate and output regenerative braking motor torque during the ABS operation when a difference between the detected wheel speed and the detected motor speed is lees than a predetermined reference value.

8. The non-transitory computer readable medium of claim 7, further comprising:
   program instructions that determine whether the ABS is operating by receiving a hydraulic control signal or hydraulic sensor signal of the ABS from an ABS controller that operates the ABS of the vehicle; and
   program instructions that remove motor torque in response to determining that the ABS is operating.

* * * * *